(12) United States Patent
Hikichi

(10) Patent No.: US 11,330,132 B2
(45) Date of Patent: May 10, 2022

(54) INFORMATION PROCESSING APPARATUS CAPABLE OF RESETTING SYSTEM, METHOD OF CONTROLLING SAME, AND STORAGE MEDIUM

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/191,062

(22) Filed: Mar. 3, 2021

(65) Prior Publication Data

US 2021/0297549 A1    Sep. 23, 2021

(30) Foreign Application Priority Data

Mar. 18, 2020  (JP) .............................. JP2020-048006

(51) Int. Cl.
*H04N 1/00* (2006.01)

(52) U.S. Cl.
CPC ..... *H04N 1/00952* (2013.01); *H04N 1/00037* (2013.01); *H04N 1/00082* (2013.01); *H04N 1/0097* (2013.01); *H04N 1/00888* (2013.01); *H04N 1/00904* (2013.01); *H04N 1/00915* (2013.01); *H04N 1/00933* (2013.01); *H04N 2201/0094* (2013.01)

(58) Field of Classification Search
CPC ........... H04N 1/00037; H04N 1/00039; H04N 1/00053; H04N 1/00082; H04N 1/00084; H04N 1/00904; H04N 1/00915; H04N 1/32667; H04N 2201/0094; G06F 3/121; G06F 3/1229; G06F 3/1234; G06K 15/408
USPC ................................................ 358/1.14, 1.15
See application file for complete search history.

(56) References Cited

U.S. PATENT DOCUMENTS

2015/0062614 A1* 3/2015 Takatani ................ G06K 15/40
                                                       358/1.14
2019/0087199 A1* 3/2019 Tanaka ................... G06F 3/1229

FOREIGN PATENT DOCUMENTS

JP           2011258032 A    12/2011

* cited by examiner

*Primary Examiner* — Kent Yip
(74) *Attorney, Agent, or Firm* — Rossi, Kimms & McDowell LLP

(57) ABSTRACT

An information processing apparatus capable of resetting the system when a sub CPU abnormally operates. A controller includes a main CPU for controlling operation of the system and a sub CPU for controlling operation of specific internal devices. A first WDT circuit and a second WDT circuit are set to a first timer time and a second timer time according to respective reset signals received from the sub CPU. According to a first interrupt signal output from the first WDT circuit based on expiration of the first timer time, the second timer time is controlled to be extended to a predetermined time and execution of a process for rebooting the controller is controlled. According to a second interrupt signal output from the second WDT circuit based on expiration of the extended second timer time, execution of a process for resetting the system is controlled.

19 Claims, 6 Drawing Sheets

INFORMATION PROCESSING APPARATUS CAPABLE OF RESETTING SYSTEM, METHOD OF CONTROLLING SAME, AND STORAGE MEDIUM

BACKGROUND OF THE INVENTION

Field of the Invention

The present invention relates to an information processing apparatus, a method of controlling the same, and a storage medium.

Description of the Related Art

There is known an information processing apparatus equipped with a controller including a main CPU that controls the operation of the system and a sub CPU that controls the operations of specific internal devices. The information processing apparatus has a WDT (Watch Dog Timer) circuit for detecting an abnormal operation. In the information processing apparatus, for example, when the processing operation of the main CPU becomes abnormal, the WDT circuit notifies the sub CPU of this fact. The sub CPU having received this notification delivers an interrupt signal to the main CPU to cause the main CPU to reboot the system of the information processing apparatus. Further, in a case where the main CPU does not normally operate and does not output a response to the above-mentioned interrupt signal, the sub CPU outputs an interrupt signal to a reset circuit to reset the main CPU, and further causes the main CPU to reboot the system (see e.g. Japanese Laid-Open Patent Publication (Kokai) No. 2011-258032). Thus, conventionally, the system is reset when an abnormality is detected by the WDT circuit.

However, conventionally, since the WDT circuit delivers the notification to the sub CPU, in a case where the sub CPU is abnormally operating, no interrupt signal is output from the sub CPU to the main CPU and the reset circuit, and hence the system cannot be reset.

SUMMARY OF THE INVENTION

The present invention provides an information processing apparatus that is capable of resetting the system when a sub CPU abnormally operates, a method of controlling the same, and a storage medium.

In a first aspect of the present invention, there is provided a information processing apparatus that is provided with a controller including a main CPU that controls operation of a system and a sub CPU that controls operation of specific internal devices, comprising a first WDT circuit configured to be set to a first timer time according to a first reset signal received from the sub CPU, a second WDT circuit configured to be set to a second timer time longer than the first timer time according to a second reset signal received from the sub CPU, a first control unit configured to control the second timer time to be extended to a predetermined time and control execution of a process for rebooting the controller, according to a first interrupt signal output from the first WDT circuit based on expiration of the first timer time, and a second control unit configured to control execution of a process for resetting the system according to a second interrupt signal output from the second WDT circuit based expiration of the extended second timer time.

In a second aspect of the present invention, there is provided a method of controlling an information processing apparatus that is provided with a controller including a main CPU that controls operation of a system and a sub CPU that controls operation of specific internal devices, a first WDT circuit, and a second WDT circuit, comprising setting the first WDT circuit to a first timer time according to a first reset signal received from the sub CPU, setting the second WDT circuit to a second timer time longer than the first timer time according to a second reset signal received from the sub CPU, controlling the second timer time to be extended to a predetermined time, and controlling execution of a process for rebooting the controller, according to a first interrupt signal output from the first WDT circuit based on expiration of the first timer time, and controlling execution of a process for resetting the system according to a second interrupt signal output from the second WDT circuit based on expiration of the extended second timer time.

According to the present invention, it is possible to reset the system when the sub CPU abnormally operates.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
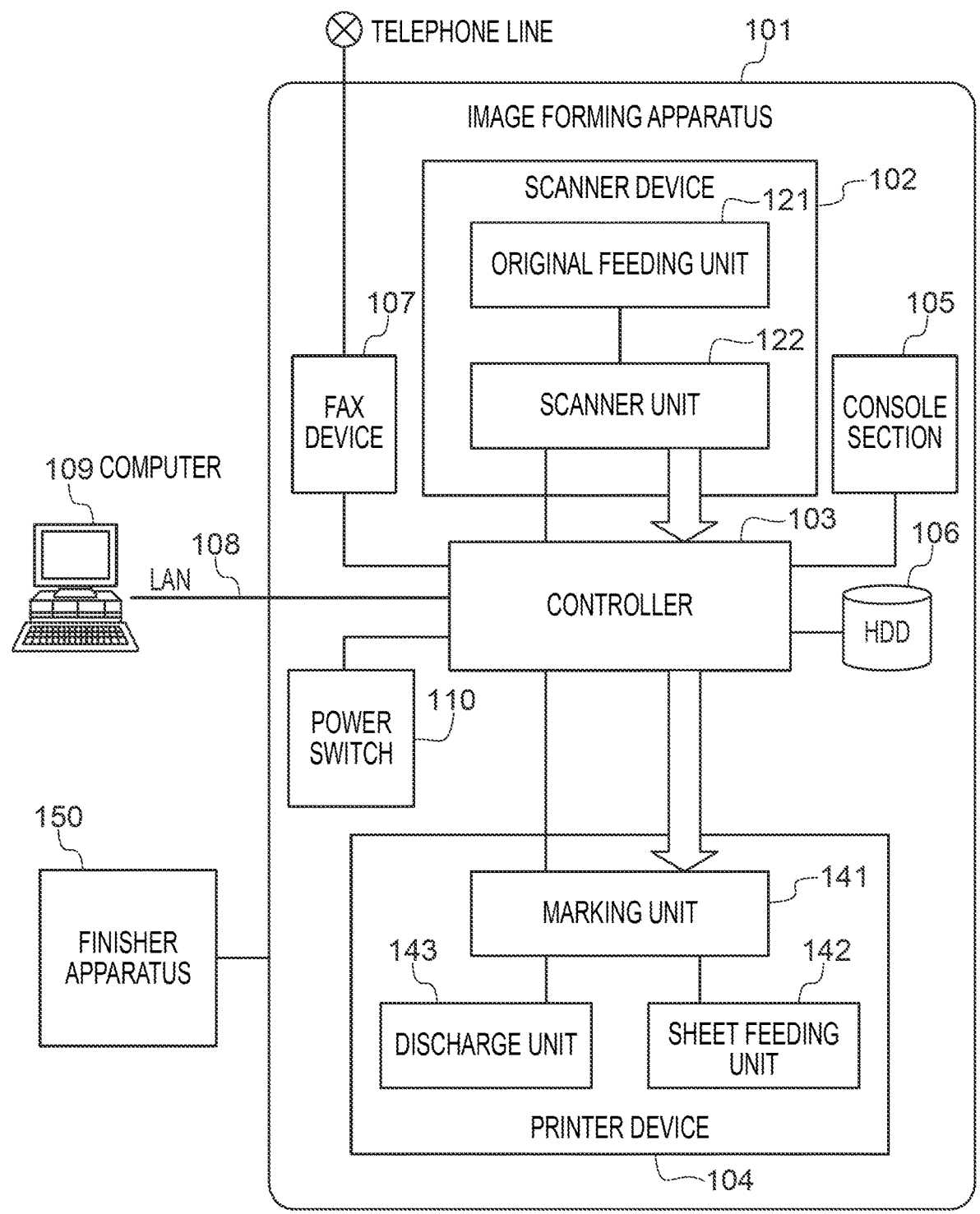
FIG. 1 is a diagram schematically showing the configuration of an image forming apparatus as an information processing apparatus according to an embodiment of the present invention.

FIG. 1 is a diagram schematically showing the configuration of an image forming apparatus 101 as an information processing apparatus according to an embodiment of the present invention.

Referring to FIG. 1, the image forming apparatus 101 includes a scanner device 102 (scanner section), a controller 103, a printer device 104 (printer section), a console section 105, an HDD 106, and a FAX device 107 (FAX section). The controller 103 is connected to the scanner device 102, the printer device 104, the console section 105, the HDD 106, and the FAX device 107.

The image forming apparatus 101 is e.g. a multifunction peripheral, and is equipped with a scan function and a data communication function. For example, the image forming apparatus 101 transmits and receives data to and from a computer 109 via a LAN 108. Further, the image forming apparatus 101 receives an instruction for operating the image forming apparatus 101 and a job execution instruction from the computer 109 via the LAN 108. Note that the number of computers connected to the image forming apparatus 101 is not limited to one, but a plurality of computers may be connected to the image forming apparatus 101.

The image forming apparatus 101 is further equipped with a copy function, an image transmission function, an image storing function, an image printing function, and so forth. The copy function is a function in which the printer device 104 prints an image read by the scanner device 102, and the controller 103 records the image in the HDD 106. The image transmission function is a function in which the controller 103 transmits an image read by the scanner device 102 to the computer 109 via the LAN 108. The image storing function is a function in which the controller 103 stores an image read by the scanner device 102 in the HDD 106, and transmits the stored image to an external apparatus or prints the stored image using the printer device 104 as required. The image printing function is a function in which the controller 103 analyzes e.g. PDL (Page Description Language) data received from the computer 109, and the printer device 104 prints the data based on information obtained from the PDL data.

The scanner device 102 includes an original feeding unit 121 and a scanner unit 122. The original feeding unit 121 automatically feeds an original. The scanner unit 122 converts information obtained by optically reading an original to digital image data. The converted digital image data is sent to the controller 103.

The printer device 104 prints digital image data on a sheet. The printer device 104 includes a sheet feeding unit 142, a marking unit 141, and a discharge unit 143. The sheet feeding unit 142 feeds sheets from a sheet bundle one by one. The marking unit 141 prints image data on a sheet fed by the sheet feeding unit 142. The discharge unit 143 discharges a printed sheet to a finisher apparatus 150 connected to the image forming apparatus 101 or the like. The finisher apparatus 150 performs processing, such as sorting, stapling, punching, and cutting, on a printed sheet output from the discharge unit 143.

The console section 105 is formed by an LCD touch panel, a power-saving button, a copy button, a cancel button, a reset button, a numeric keypad, a user mode key, and so forth, none of which are shown. The console section 105 is a user interface for operating the image forming apparatus 101. For example, a user inputs settings of the image forming apparatus 101 using the numeric keypad or the like. On the touch panel, the processing state and the like of the image forming apparatus 101 are displayed. The HDD 106 stores digital image data, control programs, and so forth The FAX device 107 transmits and receives digital image data to and from an external apparatus via a telephone line or the like. The controller 103 executes a job by giving instructions to the units connected thereto. Further, a power switch 110 for controlling on/off of power supply to the units is connected to the controller 103.

Figure 2:
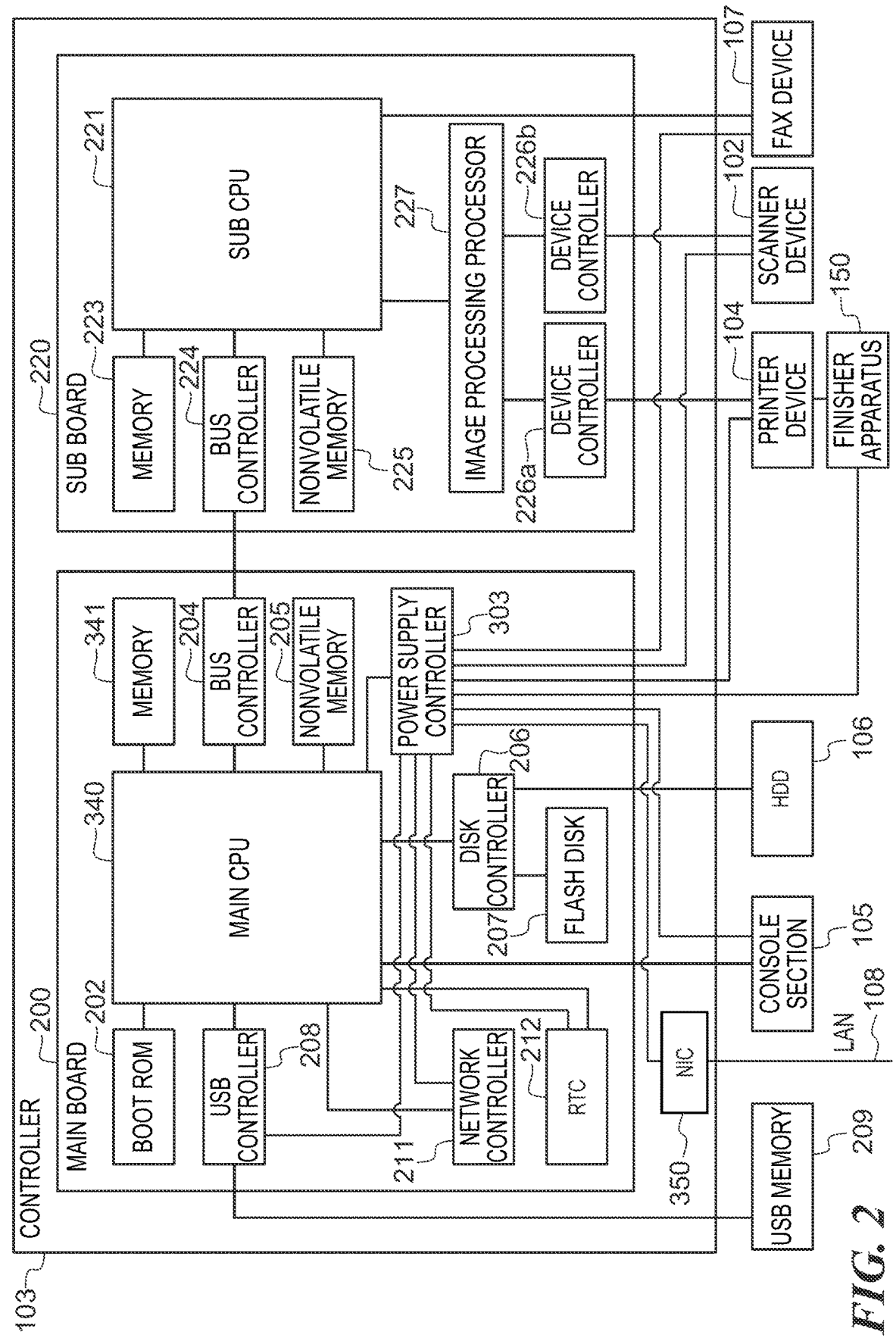
FIG. 2 is a schematic block diagram of a controller appearing in FIG. 1.

FIG. 2 is a schematic block diagram of the controller 103 appearing in FIG. 1. Referring to FIG. 2, the controller 103 includes a main board 200 and a sub board 220. The main board 200 is a general CPU system. The main board 200 includes a main CPU 340, a boot ROM 202, a memory 341, a bus controller 204, a nonvolatile memory 205, and a disk controller 206. The main board 200 further includes a flash disk 207, a USB controller 208, a network controller 211, a RTC 212, and a power supply controller 303. The main board 200 is connected to a USB memory 209, the console section 105, the HDD 106, the scanner device 102, the printer device 104, the FAX device 107, the finisher apparatus 150, and so forth.

The main CPU 340 controls the overall operation of the main board 200. The boot ROM 202 stores a boot program. The memory 341 is used as a work memory for the main CPU 340. The bus controller 204 has a bridge function with an external bus. The nonvolatile memory 205 is a storage device capable of storing data even after supply of electric power is stopped. The disk controller 206 controls writing of data into the flash disk 207 or reading of data from the flash disk 207. The flash disk 207 is a relatively small-capacity storage device implemented by a semiconductor device, such as an SSD. The USB controller 208 controls communication with a USB device connected to the main board 200, such as the USB memory 209. The power supply controller 303 is implemented by a CPLD (Complex Programmable Logic Device), and controls supply of electric power to the units connected to the controller 103.

The sub board 220 is formed by a general CPU system smaller than the main board 200 and image processing hardware. The general CPU system includes e.g. a sub CPU 221, a memory 223, and a bus controller 224, and a nonvolatile memory 225. The image processing hardware includes an image processing processor 227, device controllers 226a and 226b, and so forth.

The sub CPU 221 controls the overall operation of the sub board 220. Further, the sub CPU 221 directly controls the FAX device 107 connected to the sub board 220. The memory 223 is used as a work memory for the sub CPU 221. The bus controller 224 has a bridge function with an external bus. The nonvolatile memory 225 is a storage device capable of storing data even after supply of electric power is stopped. The image processing processor 227 performs real-time digital image data processing. The device controller 226a controls transfer of digital image data to the printer device 104 connected to the sub board 220. The device controller 226b controls transfer of digital image data from the scanner device 102 connected to the sub board 220. Note that FIG. 2 shows the configuration of the main board 200 and the sub board 220 in a simplified manner, and the configuration of the main board 200 and the sub board 220 is not limited to this. For example, the main board 200 and the sub board 220 may be further provided with a chip set, a bus bridge, a clock generator, and so forth, as the peripheral hardware of the CPU. Further, although in the present embodiment, a description will be given of the configuration in which the controller 103 is divided into the main board 200 and the sub board 220, this is not limitative. For example, all of the modules included in the main board 200 and the sub board 220 may be arranged on one board. In this configuration, the main CPU 340 and the sub CPU 221 may be connected not via the bus controllers 204 and 224, but directly connected, and may be arranged on the same board or on different blocks of the same chip and share the memories 223 and 341.

Next, the operation of the controller 103 will be described using a process for copying an image on a sheet by way of example.

When a user inputs an instruction for executing the image copying process to the console section 105, the main CPU 340 sends an image reading command to the scanner device 102 via the sub CPU 221. Upon receipt of the image reading command, the scanner device 102 converts information obtained by optically reading an original to digital image data and sends the converted digital image data to the image processing processor 227 via the device controller 226b. The image processing processor 227 performs a DMA transfer of the received digital image data to the memory 223 via the sub CPU 221 and temporarily stores the digital image data in the memory 223.

Upon confirming that a predetermined amount area or all the area of the digital image data has been stored in the memory 223, the main CPU 340 instructs the sub CPU 221 to output the digital image data. The sub CPU 221 having received this instruction sends an instruction including an address of the memory 223 where the digital image data is stored to the image processing processor 227. The digital image data in the memory 223 is sent to the printer device 104 via the image processing processor 227 and the device controller 226a according to a synchronization signal output from the printer device 104. The printer device 104 prints the received digital image data on a sheet.

In a case where a plurality of copies are printed, the main CPU 340 stores the digital image data stored in the memory 223, in the HDD 106. This makes it possible, when the second and subsequent copies are printed, to send the digital image data to be printed, from the HDD 106 or the memory 223 to the printer device 104, without acquiring the digital image data from the scanner device 102.

Figure 3:
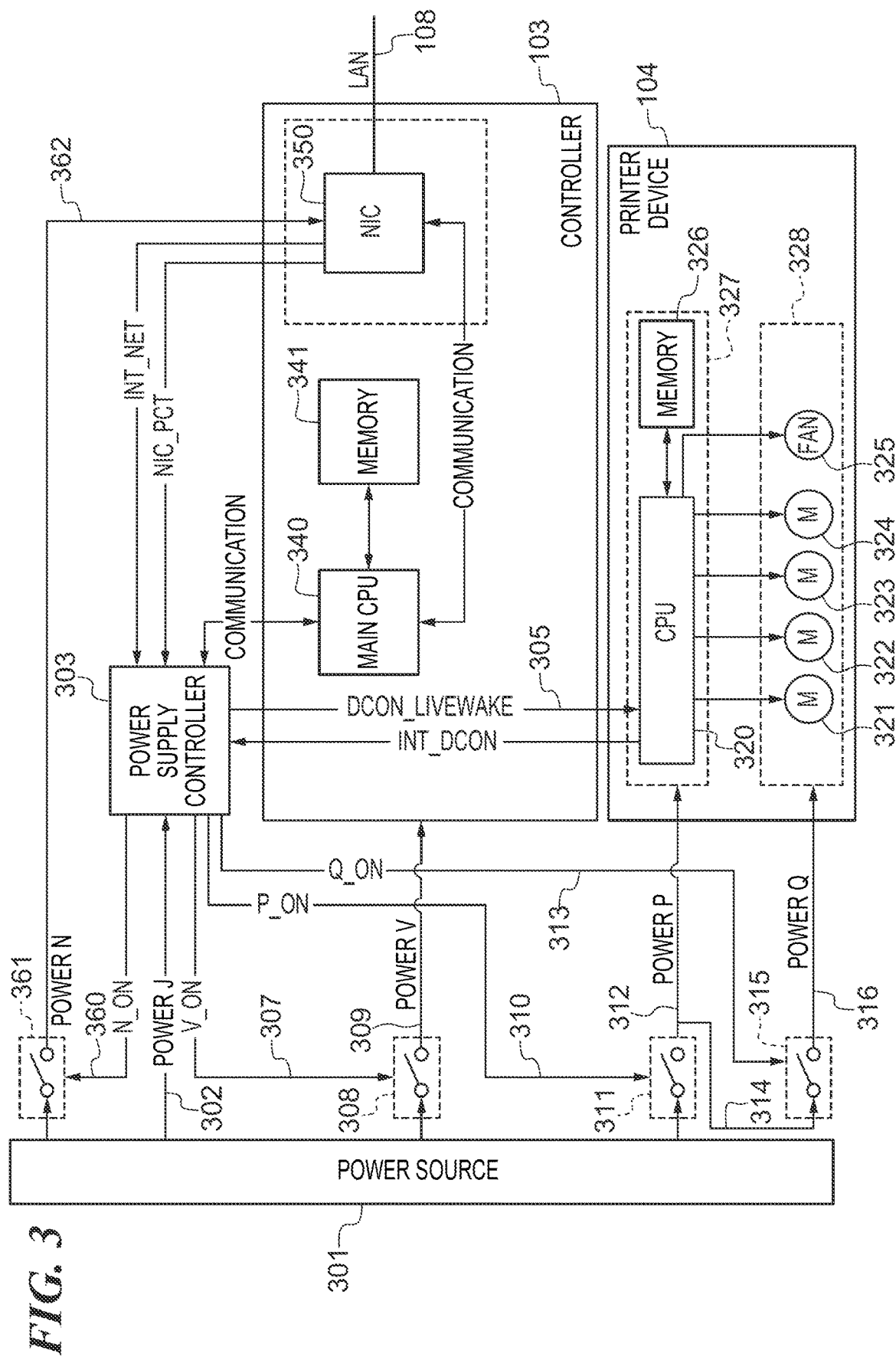
FIG. 3 is a block diagram useful in explaining a power supply configuration of the image forming apparatus shown in FIG. 1.

FIG. 3 is a block diagram useful in explaining a power supply configuration of the image forming apparatus 101 shown in FIG. 1. FIG. 3 shows the power supply configuration of part of the image forming apparatus 101, more specifically, the controller 103, the printer device 104, the power supply controller 303, and a power source 301, by way of example.

Referring to FIG. 3, electric power is always supplied to the power supply controller 303 via a power supply line 302 for supplying power J. Note that the amount of electric power consumed by the power supply controller 303 is very small, and electric power is supplied to the power supply controller 303 not only when the image forming apparatus 101 is powered on, but also when the image forming apparatus 101 is powered off. Since electric power is always supplied as described above, the power supply controller 303 can perform power supply control for causing the image forming apparatus 101 to shift from the power-off state to the power-on state.

The power supply controller 303 controls power supply via a power supply line 309 for supplying power V, a power supply line 312 for supplying power P, and a power supply line 316 for supplying power Q. For example, the power supply controller 303 switches a relay switch 308 by an IO signal V_ON which is a power supply control signal sent through a signal line 307 to control power supply via the power supply line 309, specifically, power supply from the power source 301 to the controller 103. Note that although not shown in FIG. 3 for ease of explanation, the relay switch 308 has e.g. two switches and is configured to be capable of dividing the power supply system into two. The modules of the controller 103 are each connected to one of the two switches of the relay switch 308. In a sleep state, one of the two switches of the relay switch 308, to which the modules which are turned off in the sleep state are connected, is turned off, and the other is maintained in the on-state. In a shutdown state, the two switches of the relay switch 308 are both turned off. The IO signal V_ON for controlling switching of the relay switch 308 configured as described above is not a binary signal, but a control signal having multiple values associated with the energizing states, respectively.

Further, the power supply controller 303 switches a relay switch 311 by an IO signal P_ON which is a power supply control signal sent through a signal line 310 to control power supply via the power supply line 312, specifically, power supply from the power source 301 to a printer controller 327, appearing in FIG. 3, of the printer device 104. The printer controller 327 includes at least a CPU 320 which is a logic system circuit of the printer device 104 and a memory 326.

Further, the power supply controller 303 switches a relay switch 361 by an IO signal N_ON which is a power supply control signal sent through a signal line 360 to control power supply via a power supply line 362 for supplying power N, more specifically, power supply from the power source 301 to an NIC 350 appearing in FIG. 3. The NIC 350 is a module for realizing communication between the image forming apparatus 101 and an external apparatus, such as the computer 109, via the LAN 108. Only the NIC 350 out of the modules of the controller 103 is supplied with power via the power supply line 362 different from the power supply line 309. Differently from the power supply line 309, the power supply line 362 is supplied with electric power not only in the normal state, but also in the sleep state. This makes it possible for the image forming apparatus 101 accessed e.g. from the computer 109 via the LAN 108 during the sleep state to perform processing for recovering from the sleep state. Note that electric power is not supplied via the power supply line 362 during the shutdown state except a case where a predetermined setting, such as Wake On LAN, is enabled.

The power supply controller 303 switches a relay switch 315 by an IO signal Q_ON which is a power supply control signal sent through a signal line 313 to control power supply via the power supply line 316 from the relay switch 315 connected to the power supply line 312 via a sub line 314, that is, power supply from the power source 301 to a printing section 328, appearing in FIG. 3, of the printer device 104. The printing section 328 is a high-load system unit of the printer device 104 and includes fixing units 321 to 324 and a FAN 325 of the marking unit (M) 141 as shown in FIG. 3. Note that in the present embodiment, the power supply line 316 is not required to be arranged as the sub line of the power supply line 312. For example, the power supply line 316 may be connected to the power source 301 via the relay switch 315 without via the relay switch 311.

The power supply controller 303 sends a DCON_LIVEWAKE signal issued according to an instruction from the main CPU 340 to the printer device 104 through a signal line 305. When the printer device 104 is powered on in a state in which the DCON_LIVEWAKE signal is asserted, the printer device 104 recovers quietly without performing a specific operation. The specific operation refers to e.g. an operation for rotating a motor, a roller, a polygon, etc., and operations for adjusting the temperature of the fixing units 321 to 324 and discharging heat using the FAN 325. In the present embodiment, similar to the printer device 104, the power supply control for the scanner device 102 is also performed by the power supply controller 303.

Next, power supply performed when the image forming apparatus 101 is started will be described. When a user turns on the power switch 110, the power supply controller 303 detects power-on from the state of the power supply line 302. The power supply controller 303 turns on the relay switches 308, 311, and 315 by the IO signal V_ON, the IO signal P_ON, and the IO signal Q_ON, respectively. With this, electric power is supplied to the units as the targets to which electric power is to be supplied when the power is turned on. The units as the power supply targets to which electric power is to be supplied when the power is turned on are e.g. the controller 103, the printer device 104, and the scanner device 102. In the printer device 104 and the scanner device 102 to which electric power is supplied, the CPU provided in each device starts an initialization operation.

When electric power is supplied from the power source 301, the main CPU 340 of the controller 103 initializes the hardware. Initialization of the hardware refers to e.g. initialization of a register, initialization of interrupt, registration of a device driver at the startup of the kernel, and initialization of the console section 105. Then, the main CPU 340 initializes the software. Initialization of the software refers to e.g. calling of an initialization routine of each library, starting of processes and threads, starting of a software service for communicating with the printer device 104 and the scanner device 102, and drawing on the console section 105. When all of the above-mentioned initialization operations are completed, the main CPU 340 shifts to a standby state.

Next, power supply in the standby state will be described. The standby state refers to a state in which the printer device 104 and the scanner device 102 are not used after the image forming apparatus 101 has been started. In the standby state, the power supply state is different depending on a situation. For example, immediately after the start of the image forming apparatus 101, electric power is supplied from the power source 301 to all of the units of the image forming apparatus 101. In a case where print processing is not being executed, electric power is not supplied from the power source 301 to the printer device 104. In a case where the console section 105 is not lighted and it is determined that there is no user in front of the image forming apparatus 101, electric power is not supplied from the power source 301 to the scanner device 102.

Next, power supply in a PDL printing state in which the printer device 104 and the scanner device 102 are used will be described. As an example of the PDL printing state, a case where PDL data is received from the computer 109 and printing is performed based on the received PDL data will be described.

The main CPU 340 of the controller 103 analyzes PDL data received from the computer 109 via the LAN 108 and generates a print job. Then, the main CPU 340 instructs the power supply controller 303 to supply electric power to the printer device 104. The power supply controller 303 having received this instruction switches the relay switch 311 by the IO signal P_ON to supply electric power from the power source 301 to the printer device 104 via the power supply line 312. When electric power is supplied to the printer device 104, the main CPU 340 executes the print job. In the print job, the main CPU 340 sends the data to be printed to the memory 341, the bus controller 204, the bus controller 224 of the sub board 220, and the sub CPU 221 of the sub board 220. Further, the main CPU 340 sends the above-mentioned data to the printer device 104 via the image processing processor 227 and the device controller 226a. The printer device 104 prints the received data, and when the printing is completed, the printer device 104 notifies the main CPU 340 of this fact. Upon receipt of the notification indicating completion of the printing, the main CPU 340 instructs the power supply controller 303 to stop power supply to the printer device 104. The power supply controller 303 having received this instruction switches the relay switch 311 by the IO signal P_ON to stop power supply from the power source 301 to the printer device 104.

Next, power supply performed when the main CPU 340 shifts from the standby state to the sleep state will be described. In the standby state, in a case where a predetermined time period elapses without user's operation of the console section 105 and the like, in a case where the user presses the power-saving key (not shown) on the console section 105, in a case where a time set in advance is reached, or in like cases, the main CPU 340 starts a process for shifting to the sleep state. More specifically, the main CPU 340 gives an instruction for shifting to the sleep state to the power supply controller 303. The power supply controller 303 having received this instruction performs control for supplying electric power only to the modules which are in a powered-on state when the main CPU 340 is in the sleep state. With this, the main CPU 340 shifts to the sleep state. When the main CPU 340 shifts to the sleep state, the power consumption amount of the image forming apparatus 101 is reduced, and further, a time required to shift the image forming apparatus 101 to the standby state can be made shorter than that required at the normal start of the image forming apparatus 101.

Next, power supply performed when the main CPU 340 recovers from the sleep state will be described. When a specific recovery factor is detected in the sleep state, the main CPU 340 starts a process for recovering the system from the sleep state. The specific recovery factor includes a case where an incoming call of facsimile communication or off-hook is detected, a case where a user presses the power-saving key (not shown) on the console section 105, a case where a USB device is connected to the image forming apparatus 101, a case where a time set in advance is reached, or in like other cases. To detect these specific recovery factors, in the sleep state, for example, electric power is being supplied to the USB controller 208, the network controller 211, the RTC 212, and an interrupt controller (not shown) of the controller 103, the power-saving key (not shown) on the console section 105, part of modules of the FAX device 107, and various sensors (not shown). Upon receipt of an interrupt signal indicating the above-mentioned specific recovery factor, the power supply controller 303 recovers the main CPU 340 from the sleep state. The main CPU 340 having recovered from the sleep state notifies the power supply controller 303 of this fact, and further, executes a recovery-from-sleep process for recovering the normal state of the software of the image forming apparatus 101. The power supply controller 303 having received this notification performs control for supplying electric power to the modules which are turned on when recovered from the sleep state.

For example, in a case where a specific recovery factor, such as reception of PDL data from the computer 109, is detected, electric power is supplied to the controller 103, the printer device 104, and the scanner device 102. Note that although a power supply control signal delivered to the scanner device 102 is not shown in FIG. 3 for ease of explanation, the power supply control signal delivered to the printer device 104 may be commonly used as the power supply control signal for the scanner device 102. Alternatively, another power supply control signal (not shown) may be used for the scanner device 102.

Next, a reset control process performed when the main CPU 340 and/or the sub CPU 221 abnormally operate(s) will be described.

Figure 4:
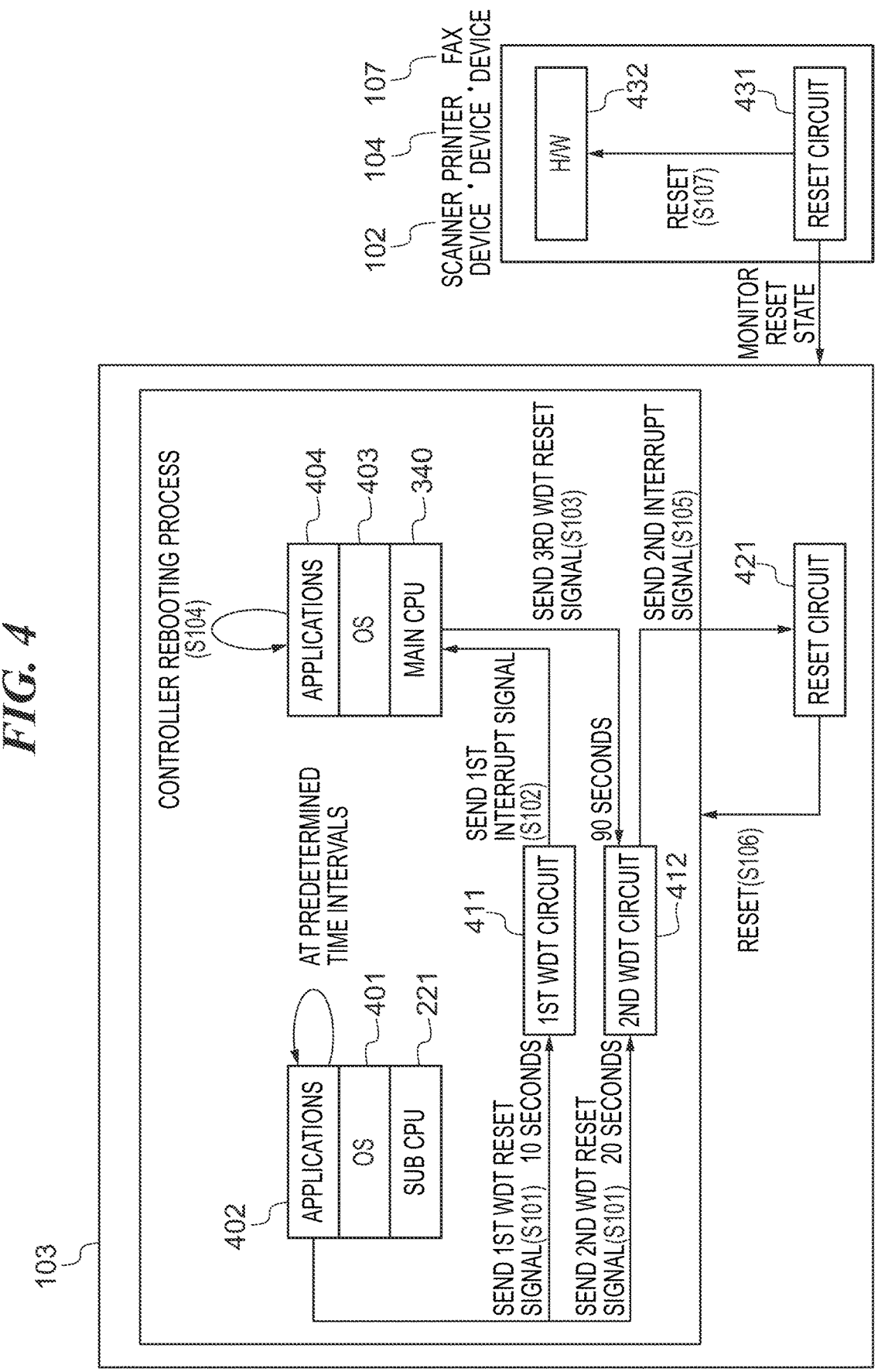
FIG. 4 is a diagram useful in explaining a reset control process performed when a sub CPU appearing in FIG. 2 abnormally operates.

FIG. 4 is a diagram useful in explaining the reset control process performed when the sub CPU 221 appearing in FIG. 2 abnormally operates. Although omitted from illustration in FIG. 2, as shown in FIG. 4, the controller 103 further includes a reset circuit 421 and two WDT (Watchdog Timer) circuits, specifically, a first WDT circuit 411 and a second WDT circuit 412. The reset circuit 421 is a module for resetting the controller 103. The first WDT circuit 411 and the second WDT circuit 412 detect an abnormal operation of the sub CPU 221.

Referring to FIG. 4, using an application 402 operating on an OS 401, the sub CPU 221 sends first and second WDT reset signals for setting a first WDT reset time and a second WDT reset time to the first WDT circuit 411 and the second WDT circuit 412, respectively, at predetermined time intervals (step S101). The first and second WDT reset times are used for detection of an abnormal operation of the sub CPU 221. Note that in the present embodiment, the first WDT reset time of the first WDT circuit 411 is set to a time shorter than the second WDT reset time so as to enable the first WDT circuit 411 to detect an abnormal operation of the sub CPU 221 earlier than the second WDT circuit 412. For example, the first WDT reset time of the first WDT circuit 411 (first timer time) is set to a time indicated by the received first WDT rest signal, e.g. 10 seconds. Further, the second WDT reset time of the second WDT circuit 412 (second timer time) is set to a time indicated by the received second WDT rest signal, e.g. 20 seconds.

In a case where after the first WDT reset time, e.g. 10 seconds, has been set, the first WDT reset signal is not received next from the sub CPU 221 before the lapse of the set 10 seconds, i.e. in a case where the first WDT reset time has expired, the first WDT circuit 411 sends a first interrupt signal to the main CPU 340 (step S102).

Upon receipt of the first interrupt signal, the main CPU 340 sends a third WDT reset signal for extending the second WDT reset time, to the second WDT circuit 412 (step S103). The second WDT circuit 412 extends the second WDT reset time to a predetermined time according to the received third WDT reset signal. The predetermined time is a time period which is longer than 20 seconds set as the second WDT reset time and is obtained by adding a predetermined margin to a time required to execute a process for rebooting the controller 103, described hereinafter, e.g. 90 seconds.

Further, after execution of the step S103, the main CPU 340 executes the process for rebooting the controller 103 (step S104). The process for rebooting the controller 103 includes a process for storing data associated with an OS 403 and applications 404, appearing in FIG. 4, controlled by the main CPU 340, and a process for unmounting the HDD 106. Thus, in the present embodiment, the time required to complete execution of the process for rebooting the controller 103 is secured before the second WDT circuit 412 detects an abnormal operation of the sub CPU 221.

In a case where after the extended second WDT reset time, e.g. 90 seconds, has been set, the second WDT reset signal is not received next from the sub CPU 221 before the lapse of the set 90 seconds, i.e. in a case where the extended second WDT reset time has expired, the second WDT circuit 412 sends a second interrupt signal to a reset circuit 421 (step S105). In the image forming apparatus 101, a process for resetting the system of the image forming apparatus 101 is executed based on the second interrupt signal. More specifically, the reset circuit 421 sends a reset signal to each module of the controller 103 according to the received second interrupt signal to reset the controller 103 (step S106). Further, the devices, such as the scanner device 102, the printer device 104, and the FAX device 107, are reset by reset circuits 431, appearing in FIG. 4, which are provided in the respective devices. That is, each reset circuit 431 monitors the reset state of the controller 103, and in a case where the controller 103 is reset, the reset circuit 431 issues a reset signal to hardware 432 provided in each device to reset the device (step S107).

According to the above-described embodiment, the second WDT reset time is extended to the predetermined time according to the first interrupt signal output from the first WDT circuit 411 based on expiration of the first WDT reset time, and the process for rebooting the controller 103 is executed. Further, the system resetting process is executed according to the second interrupt signal output from the second WDT circuit 412 based on expiration of the extended second WDT reset time. This makes it possible to reset the system when the sub CPU 221 abnormally operates.

Further, in the above-described embodiment, the process for rebooting the controller 103 includes the process for storing data associated with the applications 404 installed in the image forming apparatus 101 and the process for unmounting the HDD 106. This makes it possible, when resetting the system due to an abnormal operation of the sub CPU 221, to hold the data associated with the above-mentioned applications and further normally stop the HDD 106.

Further, in the above-described embodiment, the predetermined time includes the time required to execute the process for rebooting the controller 103. This makes it possible to secure the time required to complete execution of the process for rebooting the controller 103 before executing the system resetting process. As a result, it is possible to positively store the data associated with the applications and normally stop the HDD 106.

Figure 5:
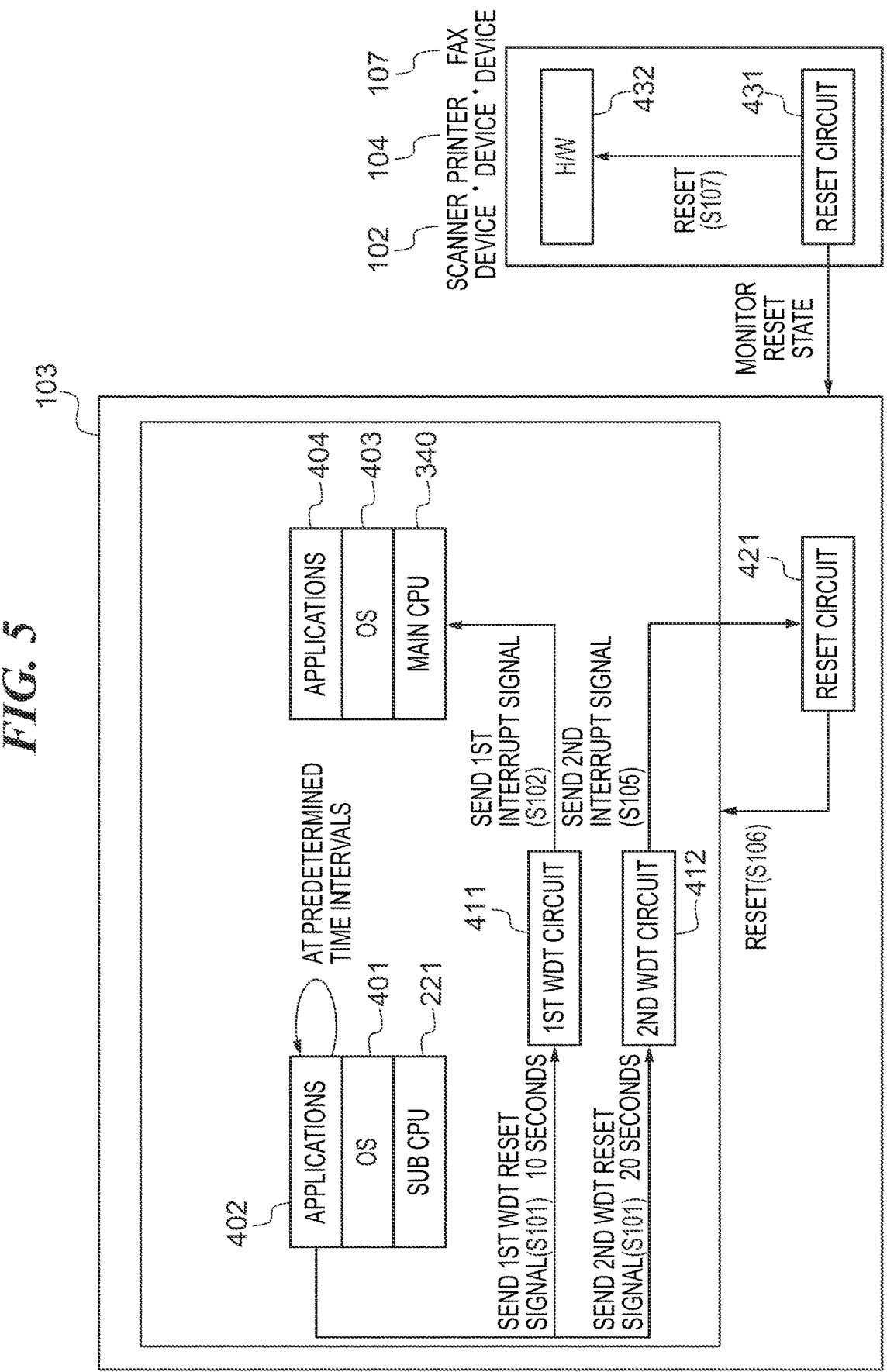
FIG. 5 is a diagram useful in explaining a reset control process performed when a main CPU and the sub CPU, appearing in FIG. 2, both abnormally operate.

FIG. 5 is a diagram useful in explaining the reset control process performed when the main CPU 340 and the sub CPU 221, appearing in FIG. 2, both abnormally operate.

Referring to FIG. 5, the sub CPU 221 executes the same step S101 as in FIG. 4. With this, the first WDT circuit 411 is set to the first WDT reset time, e.g. 10 seconds, and the second WDT circuit 412 is set to the second WDT reset time, e.g. 20 seconds.

In a case where the first WDT reset time has expired, the first WDT circuit 411 sends a first interrupt signal to the main CPU 340 by executing the same step S102 as in FIG. 4. Here, in a case where the main CPU 340 abnormally operates, e.g. hangs up, the main CPU 340 cannot respond to the first interrupt signal. In this case, in the present embodiment, the steps S103 and S104 in FIG. 4 are not executed.

That is, in a case where the second WDT reset time set in the step S102, e.g. 20 seconds, has expired, the second WDT circuit 412 sends a second interrupt signal to the reset circuit 421 by executing the same step S105 as in FIG. 4. Then, the image forming apparatus 101 executes the steps S106 and S107 to execute the system resetting process as described above with reference to FIG. 4.

In the above-described embodiment, in a case where the main CPU 340 does not output a response to the first interrupt signal, the system resetting process is executed according to the second interrupt signal output from the second WDT circuit 412 based on expiration of the second WDT reset time set in the step S101. With this, it is also possible to reset the system when both of the main CPU 340 and the sub CPU 221 abnormally operate.

Although the description is given of the present invention using the above-described embodiment, the present invention is applied not only to the above-described embodiment. For example, the RTC may be used in place of the first WDT circuit 411.

In the above-described embodiment, the relay switch 315 may be on/off-controlled by a module other than the power supply controller 303, such as the CPU 320.

Further, in the above-described embodiment, the printing section 328 may include the sheet feeding unit 142, the marking unit 141, and the discharge unit 143.

Although in the above-described embodiment, the description is given of the configuration in which the controller 103 has the two WDT circuits, this is not limitative, but the controller 103 may have three or more WDT circuits. For example, the controller 103 may have a third WDT circuit for detecting an abnormal operation of the main CPU 340. The third WDT circuit sets a WDT reset time based on a WDT reset signal delivered from the main CPU 340 at predetermined time intervals. In a case where the set WDT reset time has expired, the third WDT circuit sends an interrupt signal to the reset circuit 421 to execute the system resetting process. With this configuration, the system can also be reset when only the main CPU 340 out of the main CPU 340 and the sub CPU 221 abnormally operates.

In the above-described embodiment, power supply to the devices, such as the scanner device 102, the printer device 104, and the FAX device 107, may be stopped according to the first interrupt signal output from the first WDT circuit 411 based on expiration of the first WDT reset time, and then the steps S103 and S104 may be executed.

Figure 6:
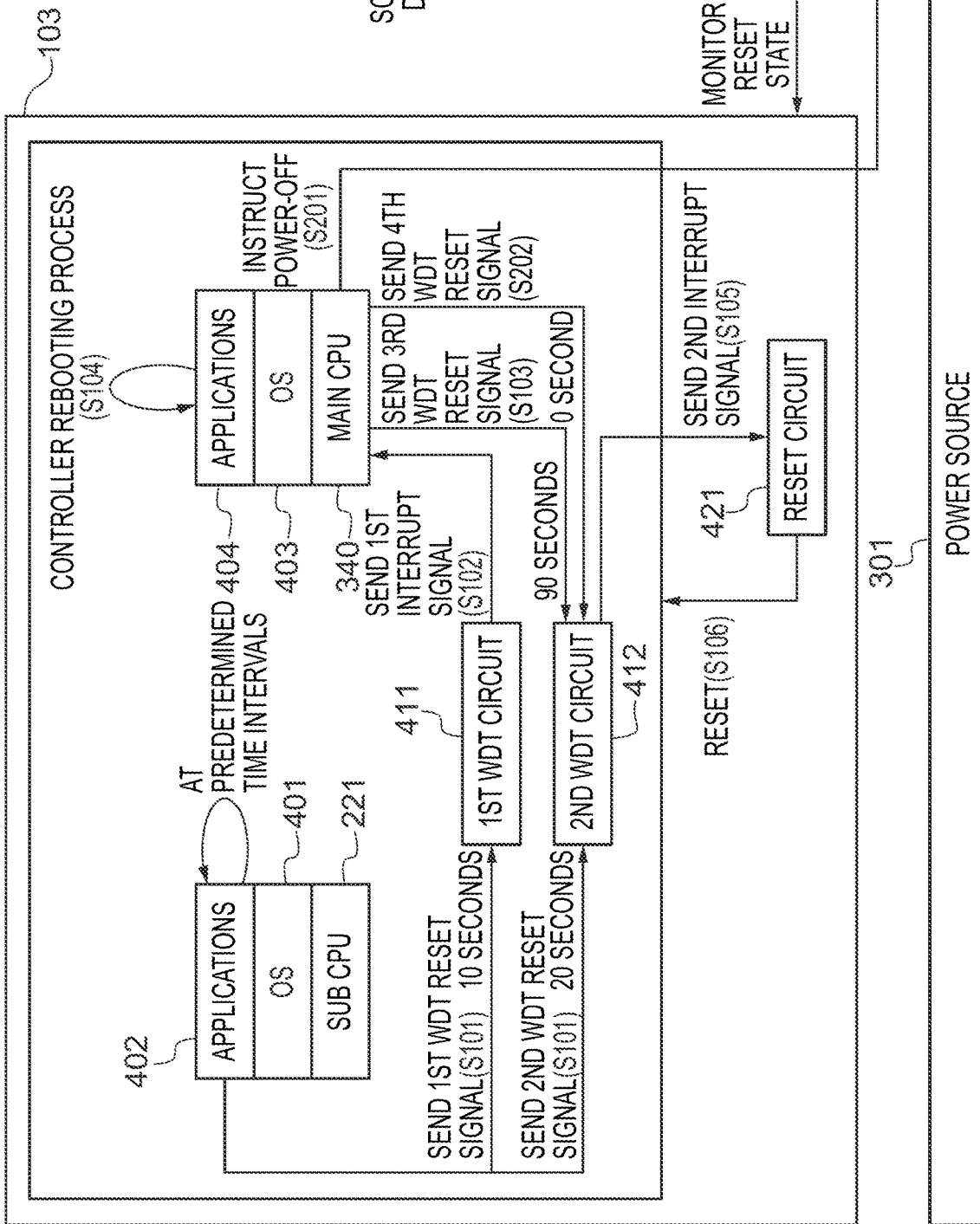
FIG. 6 is a diagram useful in explaining a reset control process including power supply control, which is performed when the sub CPU appearing in FIG. 2 abnormally operates.

FIG. 6 is a diagram useful in explaining the reset control process including power supply control performed when the sub CPU 221, appearing in FIG. 2, abnormally operates.

Referring to FIG. 6, the sub CPU 221 executes the same step S101 as in FIG. 4. With this, the first WDT circuit 411 is set to the first WDT reset time, e.g. 10 seconds, and the second WDT circuit 412 is set to the second WDT reset time, e.g. 20 seconds.

In a case where the first WDT reset time has expired, the first WDT circuit 411 sends a first interrupt signal to the main CPU 340 by executing the same step S102 as in FIG. 4.

Upon receipt of the first interrupt signal, the main CPU 340 instructs the power supply controller 303 to stop power supply from the power source 301 to the devices controlled by the controller 103 (hereinafter referred to as the "controller controlling devices") (step S201). The controller controlling devices refers to e.g. the scanner device 102, the printer device 104, and the FAX device 107. When power supply from the power source 301 to the controller controlling devices is stopped, the main CPU 340 sends a third WDT reset signal for extending the second WDT reset time to the second WDT circuit 412 by executing the same step S103 as in FIG. 4. The second WDT circuit 412 sets the second WDT reset time to a predetermined time period, e.g. 90 seconds, which is longer than the time e.g. 20 seconds, set in the step S101, according to the received third WDT reset signal.

Further, after execution of the step S103, the main CPU 340 executes the process for rebooting the controller 103 by executing the same step S104 as in FIG. 4. When the process for rebooting the controller 103 is completed, the main CPU 340 sends a fourth WDT reset signal for setting the second WDT reset time to "0 seconds" to the second WDT circuit 412 (step S202). The second WDT circuit 412 sets the second WDT reset time to "0 seconds" according to the received fourth WDT reset signal.

The second WDT circuit 412 immediately sends a second interrupt signal to the reset circuit 421 according to the second WDT reset time set to "0 second" by executing the same step S105 as in FIG. 4. Thus, in the present embodiment, immediately after completion of the process for rebooting the controller 103, the second interrupt signal which is an instruction for executing the system resetting process is sent. In the image forming apparatus 101, the system resetting process is executed based on the second interrupt signal by executing the same steps S106 and S107 as in FIG. 4.

In the above-described embodiment, power supply to the controller controlling devices is stopped according to the first interrupt signal output from the first WDT circuit 411 based on expiration of the first WDT reset time, and then the steps S103 and S104 are executed. This makes it possible to normally stop the controller controlling devices when resetting the system due to an abnormal operation of the sub CPU 221.

Further, in the above-described embodiment, in a case where the process for rebooting the controller 103 is completed before expiration of the extended second WDT reset time, the second WDT reset time is set to 0 seconds. This makes it possible to eliminate an unnecessary waiting time after the process for rebooting the controller 103 is completed in the reset control process, whereby it is possible to reduce the execution time of the reset control process.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-048006, filed Mar. 18, 2020, which is hereby incorporated by reference herein in its entirety.

What is claimed is:
1. An information processing apparatus that is provided with a controller including a main CPU that controls operation of a system and a sub CPU that controls operation of specific internal devices, comprising:

a first WDT circuit configured to be set to a first timer time according to a first reset signal received from the sub CPU;

a second WDT circuit configured to be set to a second timer time longer than the first timer time according to a second reset signal received from the sub CPU;

a first control unit configured to control the second timer time to be extended to a predetermined time and control execution of a process for rebooting the controller, according to a first interrupt signal output from the first WDT circuit based on expiration of the first timer time; and a second control unit configured to control execution of a process for resetting the system according to a second interrupt signal output from the second WDT circuit based expiration of the extended second timer time.

2. The information processing apparatus according to claim 1, wherein the first WDT circuit outputs the first interrupt signal to the main CPU, and wherein in a case where the main CPU does not output a response to the first interrupt signal, the second control unit controls execution of the process for resetting the system according to the second interrupt signal output from the second WDT circuit based on expiration of the second timer time set according to the second reset signal received from the sub CPU.

3. The information processing apparatus according to claim 1, further comprising a storage unit, and wherein the process for rebooting the controller includes a process for storing data associated with applications installed in the information processing apparatus and a process for unmounting the storage unit.

4. The information processing apparatus according to claim 1, wherein the predetermined time includes a time required to execute the process for rebooting the controller.

5. The information processing apparatus according to claim 1, wherein the first control unit controls the second timer time to be extended to the predetermined time after stopping power supply to the specific internal devices and controls execution of the process for rebooting the controller, according to the first interrupt signal.

6. The information processing apparatus according to claim 1, wherein the specific internal devices include a scanner section, a printer section, and a FAX section.

7. The information processing apparatus according to claim 1, wherein in a case where the process for rebooting the controller is completed before expiration of the extended second timer time, the second timer time is set to 0 seconds.

8. A method of controlling an information processing apparatus that is provided with a controller including a main CPU that controls operation of a system and a sub CPU that controls operation of specific internal devices, a first WDT circuit, and a second WDT circuit, comprising:

setting the first WDT circuit to a first timer time according to a first reset signal received from the sub CPU;

setting the second WDT circuit to a second timer time longer than the first timer time according to a second reset signal received from the sub CPU;

controlling the second timer time to be extended to a predetermined time, and controlling execution of a process for rebooting the controller, according to a first interrupt signal output from the first WDT circuit based on expiration of the first timer time; and controlling execution of a process for resetting the system according to a second interrupt signal output from the second WDT circuit based on expiration of the extended second timer time.

9. The method according to claim 8, wherein the first WDT circuit outputs the first interrupt signal to the main CPU, and the method further comprising, in a case where the main CPU does not output a response to the first interrupt signal, controlling execution of the process for resetting the system according to a second interrupt signal output from the second WDT circuit based on expiration of the second timer time set according to the second reset signal received from the sub CPU.

10. The method according to claim 8, wherein the information processing apparatus includes a storage unit, and wherein the process for rebooting the controller includes a process for storing data associated with applications installed in the information processing apparatus and a process for unmounting the storage unit.

11. The method according to claim 8, wherein the predetermined time includes a time required to execute the process for rebooting the controller.

12. The method according to claim 8, further comprising controlling the second timer time to be extended to the predetermined time after stopping power supply to the specific internal devices and controlling execution of the process for rebooting the controller, according to the first interrupt signal.

13. The method according to claim 8, wherein the specific internal devices include a scanner section, a printer section, and a FAX section.

14. The method according to claim 8, further comprising, in a case where the process for rebooting the controller is completed before expiration of the extended second timer time, setting the second timer time to 0 seconds.

15. A non-transitory computer-readable storage medium storing a program for causing a computer to execute the method according to claim 8.

16. An information processing apparatus that is provided with a controller including a main CPU that controls operation of a system and a sub CPU that controls operation of specific internal devices, comprising:

a first WDT circuit configured to be set to a first timer time according to a first reset signal received from the sub CPU;

a second WDT circuit configured to be able to set to a second timer time longer than a required to execute a process for rebooting the controller, according to a second reset signal received from the sub CPU, wherein the first WDT circuit controls execution of the process for rebooting the controller, and after completion of the process for rebooting the controller, the main CPU notifies the second WDT circuit of that the process for rebooting the controller is completed, and wherein the second WDT circuit controls execution of a process for resetting the system, according to the second WDT receiving the notification from the main CPU before expiration of the second timer time.

17. The information processing apparatus according to claim 16, wherein the first WDT circuit outputs a first interrupt signal to the main CPU based on expiration of the first timer time, and to thereby control execution of the process for rebooting the controller.

18. The information processing apparatus according to claim 16, wherein after completion of the process for rebooting the controller, the first WDT circuit controls the second timer time to be set to a predetermined time shorter than the second timer time, and the second WDT circuit controls execution of the process for resetting the system.

19. The information processing apparatus according to claim 18, wherein the second WDT circuit outputs a second interrupt signal to a reset circuit based on expiration of the extended second timer time, and to thereby controls execution of the process for resetting the system.

* * * * *